3,035,532
AUTOMATIC MACHINE FOR THE CONTINUOUS PRODUCTION OF ALIMENTARY PASTE
Mario Braibanti and Giuseppe Braibanti, Milan, Italy
Filed Mar. 24, 1959, Ser. No. 801,624
Claims priority, application Italy Mar. 28, 1958
1 Claim. (Cl. 107—30)

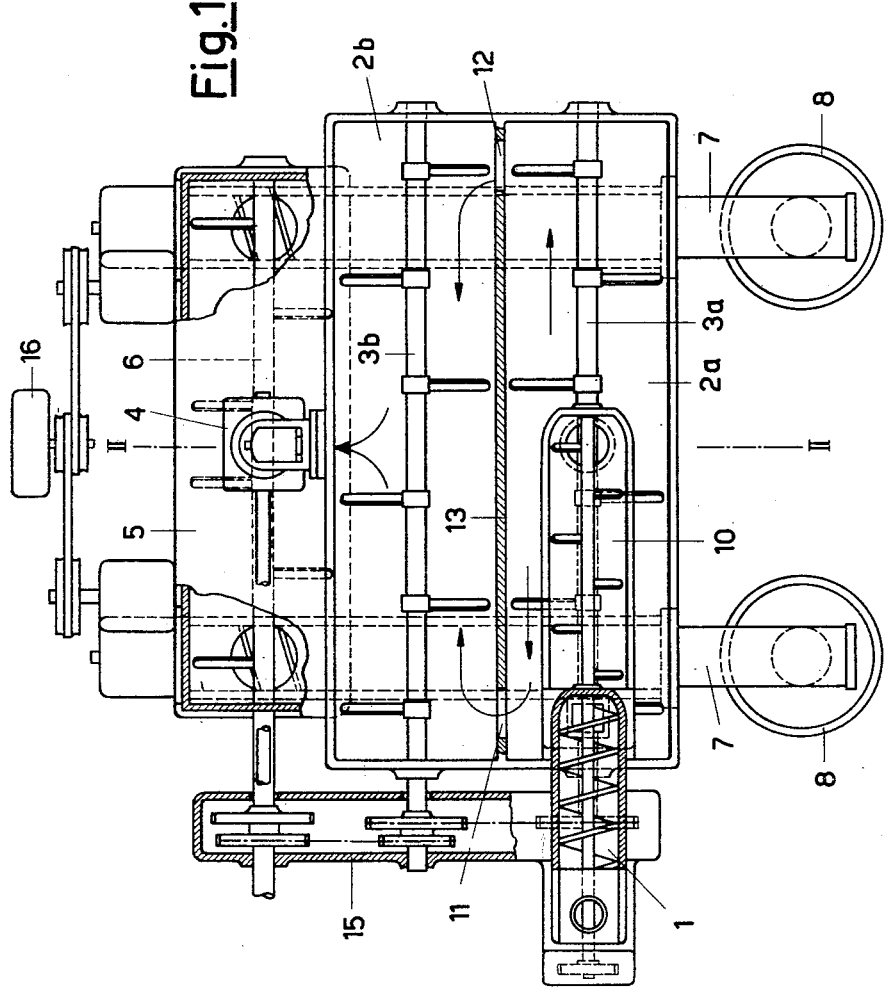

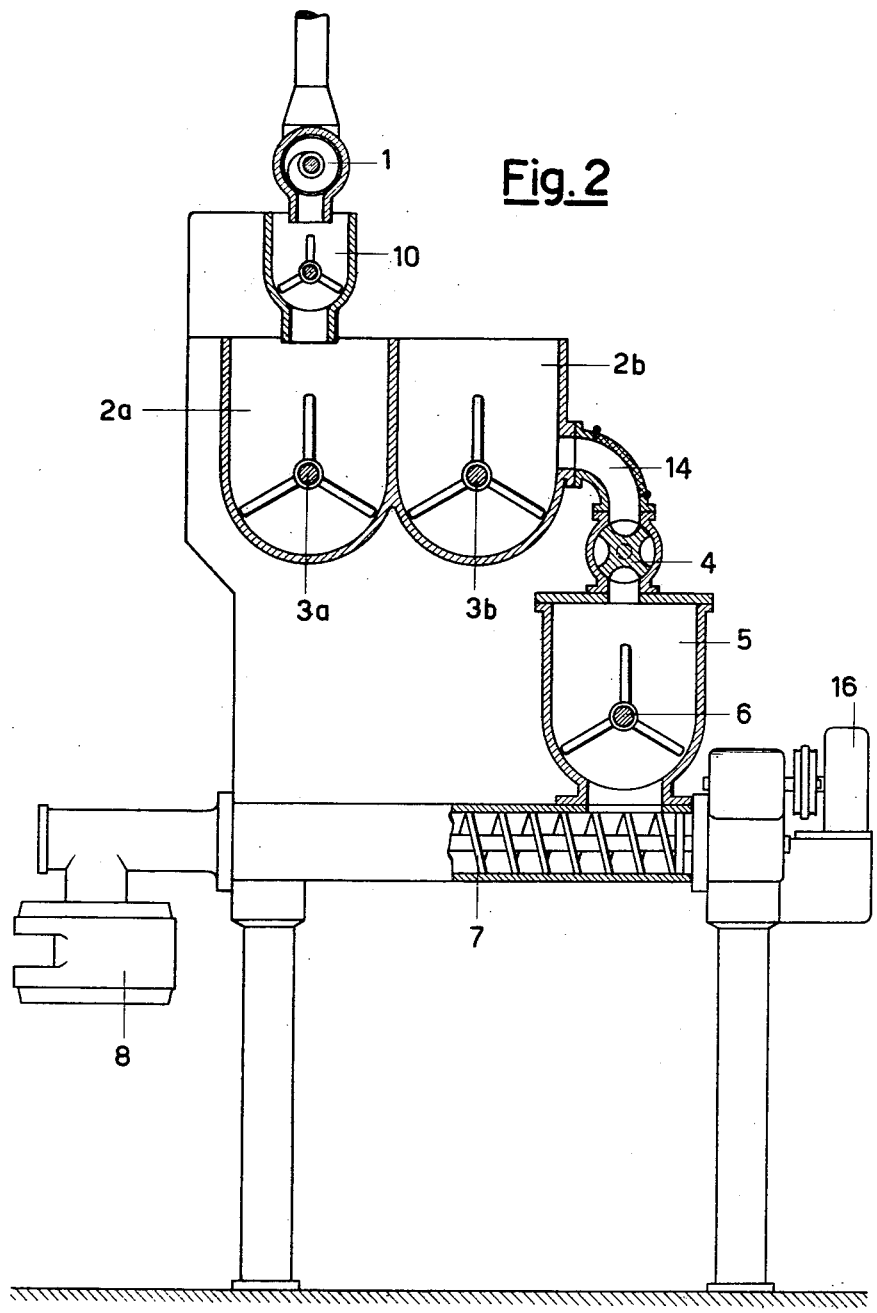

This invention relates to automatic machines for the continuous production of alimentary pastes, and to processes for making pastes and allied foodstuffs. This invention is an improvement of the invention in our Patent No. 2,857,860 of October 28, 1958.

Our previous patent was concerned with a machine for extruding pastes, comprising two symmetrically arranged pressing screws fed by a single trough. The principal objects of the above noted patent and of the present invention are very much the same, but the present invention contemplates reducing space requirements. Our present invention, in addition, provides for an improved uniformity of the final product, especially as regards taste, flavor, and behavior in cooking.

According to the present invention, flour and the other ingredients are premixed to form a master batch, then this batch is divided into two approximately equal portions and transferred to a mixing and collecting bin wherein the mixing is continued, and eventually, via a common feeding trough, the final dough is forwarded to two parallel pressing screws. The premixing bin, as well as the other bins or troughs in which the dough is processed before being extruded by the two pressing screws, are arranged in parallel and perpendicularly to the longitudinal axes of said bins. The screws are located underneath the bins and adjacent the end portions thereof. Dough-transferring ports, suitably located as will be set out in some detail hereinafter, are provided to insure proper connection between adjacently located bins.

By such an arrangement of apparatus and by adopting the process briefly outlined herein, the two-fold advantage is attained of saving a large amount of space, especially along the extrusion direction, and of facilitating the supply of drive from a single compact and self-contained power unit.

The invention will now be illustrated, with reference to a preferred embodiment thereof in the accompanying drawings, wherein:

FIG. 1 is a top plan view of a machine provided in accordnace with this invention; and FIG. 2 is a cross-sectional view of the machine taken along the line II—II of FIG. 1.

In the drawing, 1 indicates a conventional dosing device for water and the other ingredients such as flour, etc., to be fed to a premixer 10, in which the water and the other ingredients undergo a preliminary mixing.

At the front end of premixer 10, the batch of water, flour and other ingredients is discharged into a mixing and dough-dividing bin therebeneath, comprising two separate compartments $2a$—$2b$. Premixer 10 discharges precisely into a central portion of said compartment $2a$, which is a premixing bin. The two compartments $2a$ and $2b$, which is a kneading and collecting bin, are in communication with each other in the neighborhood of their ends, through the ports 11 and 12 formed in the partition wall 13 that divides the bin into the two adjacent, parallel compartments $2a$ and $2b$. Said ports 11 and 12 are adjustable as to their cross-sectional passage area, for example, by means of vertically slidable gates (not shown) or other equivalent mechanical means.

Each compartment is provided with a bladed shaft $3a$ and $3b$, respectively. The blades of those shafts are arranged symmetrically with respect to the transverse plane of symmetry of the bin $2a$—$2b$ line II—II in FIG. 1 and are inclined in such a way that the mix is conveyed in the compartment $2a$ from the center towards the ends, and in the compartment $2b$, from the ends towards the center (see the arrows in FIG. 1). A dough-transferring conduit 14, preferably fitted with a hinged cover in order to facilitate inspection, is provided for delivery from compartment $2b$ to a final dough-mixing and collecting bin 5 therebeneath.

Said conduit 14 is connected with a star valve 4 which permits the mix to fall in fluid tight manner into the underlying bin 5 in which a subatmospheric pressure is maintained by means an exhaust fan of any conventional make (not shown).

In the vat 5 turns a shaft 6 equipped with blades symmetrically arranged with respect to the transverse plane of symmetry of the valve 4 indicated by line II—II of FIG. 1. At equal distances from that plane there are two parallel compression screws 7 perpendicularly arranged with respect to the shaft 6, which receive the dough in virtually equal amounts from the bin 5 and compress it against their respective heads 8, equipped with rectangular or circular drawplates as desired.

As can be seen in the drawings, the dosing device 1, the premixer 10, the bin $2a$—$2b$, the star valve 4 and the bin 5 are arranged with parallel axes perpendicular to the axes of the compression screws 7: said screws are located in the neighborhood of the end portions of said bins.

In FIG. 1 of the accompanying drawings, it can be seen that the shafts of the dosing device of the premixer, of the bins and of the star valve project from the same side of the machine and enter the gear-box 15, wherefrom they receive their respective drives, while the screws 7 receive their drive from a common gear-box 16.

The considerable space savings and constructional simplicity of the device so constructed need not be further detailed, since they are self-explanatory to those skilled in the art.

What is claimed is:

An automatic machine, for the continuous production of alimentary pastes, comprising a premixing bin, a rotatable mixing shaft in said bin, mixing blades symmetrically positioned on said shaft and inclined with respect thereto, the blades on respective halves of said shaft being oppositely inclined, a kneading and collecting bin parallel to said premixing bin and in side-by-side relationship therewith, said premixing bin and said kneading and collecting bin being provided at their extremities with ports connecting the bins, a shaft in said kneading and collecting bin, a dough mixing and collecting bin parallel to said kneading and collecting bin, a dough-transferring conduit coupling said dough mixing and collecting bin and said kneading and collecting bin, two compression screw devices underneath the dough mixing and collecting bin and connected therewith, each screw device being adjacent a respective end portion of said dough mixing and collecting bin, said screw devices having axes disposed perpendicularly to said bins, driving means operatively associated with the shafts in the bins at corresponding ends of the latter for the synchronous actuation of the same, and a common driving means operatively associated with the screw devices for the synchronous actuation of the same.

References Cited in the file of this patent
UNITED STATES PATENTS

| | | |
|---|---|---|
| 1,790,347 | Hawkins | Jan. 27, 1931 |
| 2,531,224 | Lenner | Nov. 21, 1950 |
| 2,857,860 | Braibanti et al. | Oct. 28, 1958 |

FOREIGN PATENTS

| | | |
|---|---|---|
| 436,252 | Italy | June 4, 1948 |